United States Patent
Kuppan et al.

(10) Patent No.: US 10,923,765 B2
(45) Date of Patent: Feb. 16, 2021

(54) LITHIUM CONDUCTING CERAMIC OXIDE DECONTAMINATION METHOD

(71) Applicant: Robert Bosch GmbH, Stuttgart (DE)

(72) Inventors: Saravanan Kuppan, Sunnyvale, CA (US); Katherine Harry, Oakland, CA (US); Michael Metzger, Sunnyvale, CA (US); Nathan Craig, Santa Clara, CA (US); Jake Christensen, Elk Grove, CA (US)

(73) Assignee: ROBERT BOSCH GMBH, Stuttgart (DE)

( * ) Notice: Subject to any disclaimer, the term of this patent is extended or adjusted under 35 U.S.C. 154(b) by 132 days.

(21) Appl. No.: 16/237,101

(22) Filed: Dec. 31, 2018

(65) Prior Publication Data

US 2020/0212483 A1    Jul. 2, 2020

(51) Int. Cl.
*H01M 10/0565* (2010.01)
*H01M 10/052* (2010.01)
*C04B 35/48* (2006.01)

(52) U.S. Cl.
CPC ......... *H01M 10/0565* (2013.01); *C04B 35/48* (2013.01); *H01M 10/052* (2013.01); *C04B 2235/3203* (2013.01); *H01M 2300/002* (2013.01); *H01M 2300/0071* (2013.01)

(58) Field of Classification Search
CPC .......... H01M 10/052; H01M 10/0565; H01M 2300/002; H01M 2300/0071; C04B 41/009; C04B 41/4584; C04B 41/53; C04B 41/91; C04B 35/01; C04B 35/447; C04B 35/46; C04B 35/48; C04B 35/495; C04B 2235/3203; C04B 2111/00853; Y02E 60/10

See application file for complete search history.

(56) References Cited

U.S. PATENT DOCUMENTS

2018/0301752 A1* 10/2018 Sakamoto ............ C01G 25/006

OTHER PUBLICATIONS

Han et al., Negating interfacial impedance in garnet-based solid-state Li metal batteries, Nature Materials, Articles, Dec. 29, 2016, pp. 1-9, DOI: 10.1038/NMAT4821, 9 pages.
Luntz et al., Interfacial Challenges in Solid-State Li Ion Batteries, The Journal of Physical Chemistry Letters, Nov. 9, 2015, pp. 4599-4604, 6 pages.

(Continued)

*Primary Examiner* — Mayla Gonzalez Ramos
(74) *Attorney, Agent, or Firm* — Brooks Kushman P.C.

(57) ABSTRACT

A method of decontaminating a lithium conducting ceramic oxide material. The method includes soaking the lithium conducting ceramic oxide material having a first thickness of surface contaminants in a first organic solvent containing an inorganic salt at an inorganic salt concentration to obtain a soaked lithium conducting ceramic oxide material. The method further includes rinsing the soaked lithium conducting ceramic oxide material in a second organic solvent to obtain a decontaminated lithium conducting ceramic oxide material having a second thickness of surface contaminants less than the first thickness of surface contaminants.

16 Claims, 5 Drawing Sheets

(56) References Cited

OTHER PUBLICATIONS

Ramakumar et al., Lithium garnets: Synthesis, structure, Li conductivity, Li dynamics and applications, Progress in Materials Science, Apr. 8, 2017, pp. 325-411, Department of Physics, India, 87 pages.
Sun et al., Recent advances in all-solid-state rechargeable lithium batteries, Nano Energy, Jan. 26, 2017, China, pp. 363-386, 24 pages.
Kerman et al., Review Practical challenges hindering the Development of Solid State Li Ion Batteries, Journal of The Electrochemical Society, Jun. 9, 2017, pp. A1731-A1744, 14 pages.
Sharafi et al., Surface Chemistry Mechanism of Ultra-Low Interfacial Resistance in the Solid-State Electrolyte, Chemistry of Materials, Aug. 11, 2017, pp. A-H, 8 pages.
Li et al., Garnet Electrolyte with an Ultralow Interfacial Resistance for Li-Metal Batteries, Journal of the American Chemical Society, Apr. 24, 2018, pp. 6448-6455, DOI: 10.1021/jacs.8b03106, Austin, TX, 8 pages.

* cited by examiner

LITHIUM CONDUCTING CERAMIC OXIDE DECONTAMINATION METHOD

TECHNICAL FIELD

The present disclosure relates to a lithium conducting ceramic oxide decontamination method and decontaminated lithium conducting ceramic oxide materials, and in some embodiments, the use of such materials as solid state electrolytes (SSEs) with improved interfacial properties.

BACKGROUND

Solid state electrolyte (SSE) systems exhibiting $Li^+$ conductivity of greater than 10 $mScm^{-1}$ at room temperature have shown promise for application with lithium metal anodes in high energy and high power density batteries. This application may offer several advantages over traditional liquid electrolyte system. Non-limiting examples of these benefits include higher gravimetric and volumetric energy density, broader operable voltage, wider temperature range, and enhanced safety. However, many obstacles remain for implementing such SSE systems with lithium metal anodes in such applications.

SUMMARY

According to one embodiment, a method of decontaminating a lithium conducting ceramic oxide material is disclosed. The method includes soaking the lithium conducting ceramic oxide material having a first thickness of surface contaminants in a first organic solvent containing an inorganic salt at an inorganic salt concentration to obtain a soaked lithium conducting ceramic oxide material. The method further includes rinsing the soaked lithium conducting ceramic oxide material in a second organic solvent to obtain a decontaminated lithium conducting ceramic oxide material having a second thickness of surface contaminants less than the first thickness of surface contaminants. The first thickness may be any of the following values or in the range of any two of the following values: 50, 55, 60, 65 and 70 nm. The second thickness may be any of the following values or in the range of any two of the following values: 1.0, 1.2, 1.4, 1.6, 1.8, 2.0, 3.0, 4.0 and 5.0 nm.

According to another embodiment, a method of forming a solid state electrolyte material is disclosed. The method includes soaking a lithium conducting ceramic oxide material having a first thickness of surface contaminants in a first organic solvent containing an inorganic salt at an inorganic salt concentration to obtain a soaked lithium conducting ceramic oxide material. The method further includes rinsing the soaked lithium conducting ceramic oxide material in a second organic solvent to obtain a decontaminated lithium conducting ceramic oxide material having a second thickness of surface contaminants less than the first thickness of surface contaminants. The method also includes drying the decontaminated lithium conducting ceramic oxide material to obtain a dried, decontaminated lithium conducting ceramic oxide material. The method also includes mixing the dried, decontaminated lithium conducting ceramic oxide material with a polymer material to form a solid state electrolyte material.

In yet another embodiment, a thin film solid state electrolyte material is disclosed. The thin film solid state electrolyte material includes a decontaminated lithium conducting ceramic oxide material including a surface thickness of bicarbonates of less than 5.0 nm. The thin film solid state electrolyte material further includes a polymeric material. The thin film solid state electrolyte material has a thickness of less than 100 µm.

DETAILED DESCRIPTION

Figure 1:
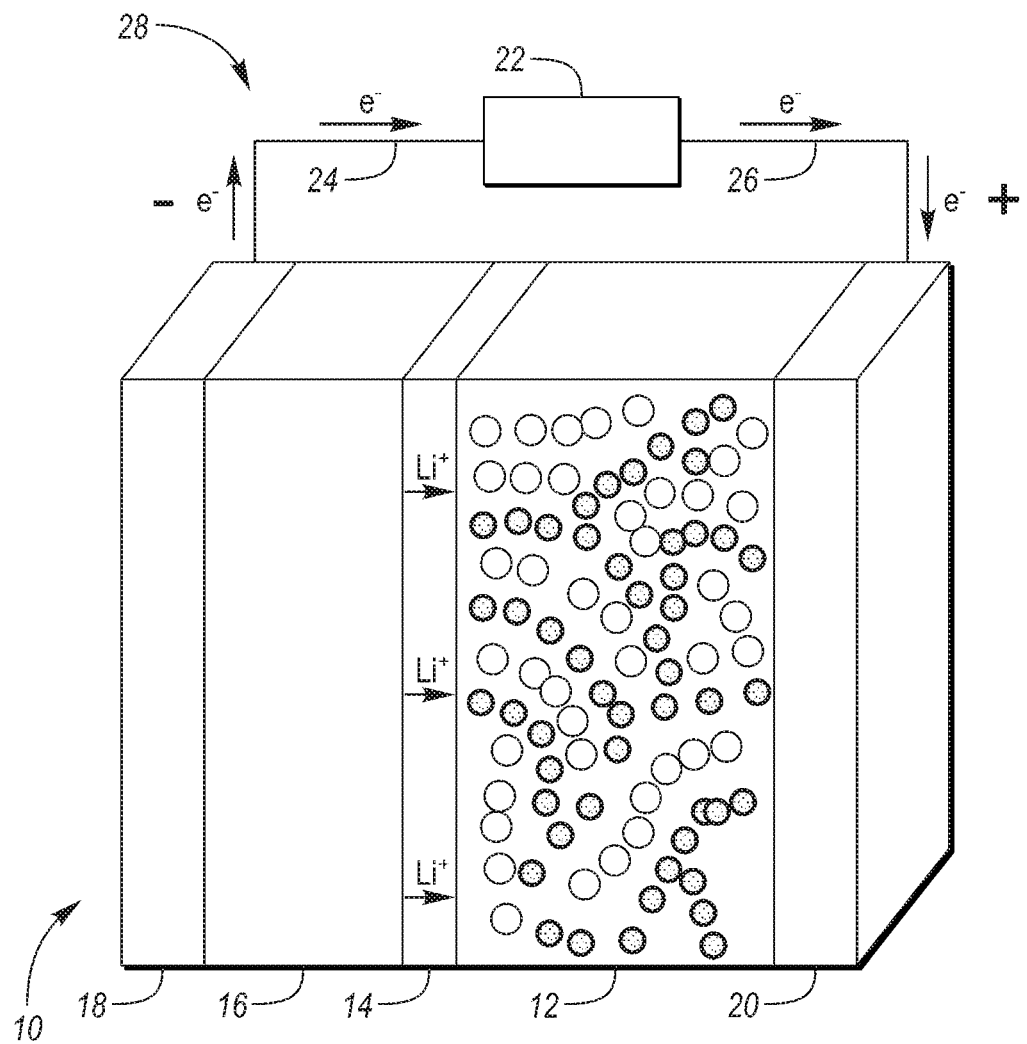
FIG. 1 is a schematic diagram of a solid state battery (SSB) according to one embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; the description of a group or class of materials as suitable or preferred for a given purpose in connection with the invention implies that mixtures of any two or more of the members of the group or class are equally suitable or preferred; molecular weights provided for any polymers refers to number average molecular weight; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

This invention is not limited to the specific embodiments and methods described below, as specific components and/or conditions may, of course, vary. Furthermore, the terminology used herein is used only for the purpose of describing particular embodiments of the present invention and is not intended to be limiting in any way.

As used in the specification and the appended claims, the singular form "a," "an," and "the" comprise plural referents unless the context clearly indicates otherwise. For example, reference to a component in the singular is intended to comprise a plurality of components.

The term "substantially" or "about" may be used herein to describe disclosed or claimed embodiments. The term "substantially" or "about" may modify a value or relative characteristic disclosed or claimed in the present disclosure. In such instances, "substantially" or "about" may signify that the value or relative characteristic it modifies is within ±0%, 0.1%, 0.5%, 1%, 2%, 3%, 4%, 5% or 10% of the value or relative characteristic.

The use of lithium metal anodes in solid state batteries (SSBs) with energy densities exceeding 500 Whkg$^{-1}$ or 1,000 WhL$^{-1}$ with costs lower than $100 per kWh$^{-1}$ is not currently feasible. Advancement of solid state electrolytes (SSEs) to achieve a Li$^+$ conductivity greater than 10 mScm$^{-1}$ at room temperature is sought so that these performance levels may be met. One material that shows promise to achieve this conductivity is the garnet-type ceramic oxide of Li$_7$La$_3$Zr$_2$O$_{12}$ (otherwise referred to as LLZO). LLZO is a prime candidate for this application because it has (1) a property of fast Li-ion conduction, (2) decreased flammability properties, (3) adequate mechanical strength (e.g., an elastic modulus of at least 150 GPa and a fracture toughness of 0.86 to 1.63 MPam), (4) a wide electrochemical window (e.g., 6 volts or higher), and (5) chemical stability with metallic Li. Despite these promising attributes, there has been minimal success in employing ceramic oxides (including LLZO) in high-performance SSBs. One of the major obstacles to such success has been the large interfacial impedance between the ceramic oxide and electrode materials.

Unlike many traditional ceramic oxides (e.g., La$_2$O$_3$, Al$_2$O$_3$ and ZrO$_2$), LLZO and other Li$^+$ conducting ceramic oxides require a high degree of care during processing and storage due to their high reactivity. During wet processing, Li$^+$ conducting ceramic oxides react with solvents and produce adventitious carbon. Similarly, during storage, Li$^+$ conducting ceramic oxides produce thick layers of ionically insulating materials (e.g., carbonates, hydroxides, etc.) on the surface of the Li$^+$ conducting ceramic oxides that act as surface contamination. The formation of these layers is one of the main causes of interfacial resistance between LLZO and Li metal. Moreover, the formation of these layers may cause a dramatic decrease in contact area between the Li metal and the Li$^+$ conducting ceramic oxide.

Current proposals exist to clean the surface of Li$^+$ conducting ceramic oxides such as LLZO of surface contamination. Several surface conditioning protocols have been proposed to decontaminate the LLZO surface. One conditioning protocol is dry polishing (DP) and another conditioning protocol is wet polishing (WP). DP can include dry polishing LLZO manually with sand paper at a grit size. The grit size can be any one of the following values or within the range of any two of the following values: 400, 600 and 1200. WP can include wet polishing LLZO with a glycol-based polishing liquid using an automated polisher with diamond polishing abrasives. After this step, the LLZO is washed with alcohol to remove residual polishing fluid from the surface. However, it is not possible to use these WP and DP processes in a relatively thin (e.g., 10 to 40 µm) Li+ conducting ceramic oxides because these processes would damage the oxide material. Post heat treatments (e.g., at a temperature in a range of 400 to 700° C.) may also be used to decompose surface contaminants. However, in many situations, the surface contaminant layer simply reforms during cooling. As another drawback, these treatments are also energy intensive. As another proposal, a surface modification or coating using Au or Al$_2$O$_3$ has been attempted. Another proposal is reacting LLZO with carbon at 700° C. However, these processes are not scalable and add additional processing steps. Additionally, if the coating does not maintain integrity upon cycling, it might compromise the cycle life.

Yet, in view of these challenges, much work continues to be conducted in the area of SSE systems exhibiting Li$^+$ conductivity greater than 10 mScm$^{-1}$ at room temperature to implement lithium metal anodes in high energy and high power density batteries. However, many fundamental issues and significant engineering challenges remain to realize the potential of these applications, especially in the area of electrochemical interfaces. Surface chemistry of a Li$^+$ conducting ceramic oxide of a SSE controls the interfacial resistance and Li wettability. Typically, in SSBs, lower interfacial resistance relative to liquid electrolytes is obtained by a complicated surface modification or using a laborious post sintering process or mechanical grinding. What is needed is a processing method that significantly reduces the interfacial resistance between Li$^+$ conducting ceramic oxide and Li metal by removing surface contaminants.

In one or more embodiments, a method is disclosed to reduce interfacial resistance between a Li$^+$ conducting ceramic oxide layer and Li metal. Moreover, a ceramic oxide material having a surface with reduced interfacial resistance is disclosed. These methods and materials may increase the Li wettability and achieve lower interfacial resistance between Li and a ceramic oxide layer such as LLZO. In one aspect, wettability may be measured by a contacting angle of wetting of molten Li on the Li$^+$ conducting ceramic oxide, such as LLZO. An acceptable wettability may be indicated by one of the following contact angles or within a range of any two of the following contact angles: 40°, 50°, 60°, 70°, 80°, 90° and 100°. In one aspect, interfacial resistance may be determined by electrochemical impedance spectroscopy. An acceptable lower interfacial resistance may be any one of the following or in the range of any two of the following: 0, 5, 10, 15 and 20 Ohm cm$^2$.

FIG. 1 is a schematic diagram of a SSB 10 according to one embodiment. SSB 10 includes cathode 12, electrolyte 14, anode 16, negative current collector 18 and positive current collector 20. Electrolyte 14 is configured to function as both an ionic conductor and separator. Cathode 12 and anode 16 contact opposing surfaces of electrolyte 14. Negative current collector 18 contacts the surface of anode 16 opposing the surface of anode 16 contacting electrolyte 14. Positive current collector 18 contacts the surface of cathode 12 opposing the surface of cathode 12 contacting electrolyte 14. SSB 10 is connected to electric load 22 through conductors 24 and 26. Conductor 24 connects negative current collector 18 to electric load 22. Conductor 26 connects positive current collector 20 to electric load 22.

Anode 16 may be formed of an Li metal. Other non-limiting materials that can be used as anode 16 includes carbon, titanates and lithium alloys. Electrolyte 14 may be formed of an Li$^+$ conducting ceramic oxide such as LLZO. Other non-limiting examples of Li$^+$ conducting ceramic oxides include $Li_5La_3Ta_2O_{12}$ (LLTO), $Li_6La_2CaTa_2O_{12}$ (LLCTO), $Li_6La_2ANb_2O_{12}$ (A=Ca, Sr), $Li_{1+x}Al_xGe_{2-x}(PO_4)_3$ (LAGP), $Li_{1.4}Al_{0.4}(Ge_{2-x}Ti_x)_{1.6}(PO_4)_3$ (LAGTP), perovskite $Li_{3x}La_{2/3-x}TiO_3$ (LLTO), $Li_{0.8}La_{0.6}Zr_2(PO_4)_3$ (LLZP), $Li_{1+x}Ti_{2-x}Al_x(PO_4)_3$ (LTAP), $Li_{1+x+y}Ti_{2-x}Al_xSi_y(PO_4)_{3-y}$ (LTASP), $LiTi_xZr_{2-x}(PO_4)_3$ (LTZP), $Li_2Nd_3TeSbO_{12}$ and mixtures thereof. Cathode 12 may be formed of an Li-based oxide material such as lithium cobalt oxide ($LiCoO_2$) (LCO), lithium manganese oxide ($LiMn_2O_4$) (LMO), lithium nickel manganese cobalt oxide ($LiNiMnCoO_2$) (NMC), lithium iron phosphate ($LiFePO_4$) (LIP), lithium nickel cobalt aluminum oxide ($LiNiCoAlO_2$) (NCA), lithium titanate ($Li_4Ti_5O_{12}$) (LT), and mixtures thereof. Cathode 12 may have a crystal lattice structure. Negative current collector 18 may be formed of an elemental or alloy metal material, such as copper or copper alloy. Positive current collector 18 may be formed of an elemental or alloy material, such as aluminum or aluminum alloy.

During charging of SSB 10, Li ions de-intercalate from the crystal lattice structure of cathode 12 and transfer to anode 16 via the ionic conductive solid electrolyte 14, while the electrons transfer to anode 16 via external circuit 28, which includes conductors 24 and 26 and electric load 22. During discharging, as shown in FIG. 1, Li ions de-intercalate from anode 16 and transfer to cathode 12 via solid electrolyte 14 while electrons are passed through external circuit 28 and drive electric load 22 to work. Several reaction steps are involved at the interface between electrolyte 14 and cathode 12 and electrolyte 14 and anode 16. First, Li ions diffuse in electrolyte 14. Second, the Li ions are adsorbed on the surface of either cathode 12 or anode 16. Third, a charge is transferred. Fourth, intercalation into either cathode 12 or anode 16 occurs. Fifth, Li ions diffuse into either cathode 12 or anode 16. Also, surface reactions take place between electrolyte 14 and cathode 12 and electrolyte 14 and anode 16.

Figure 2:
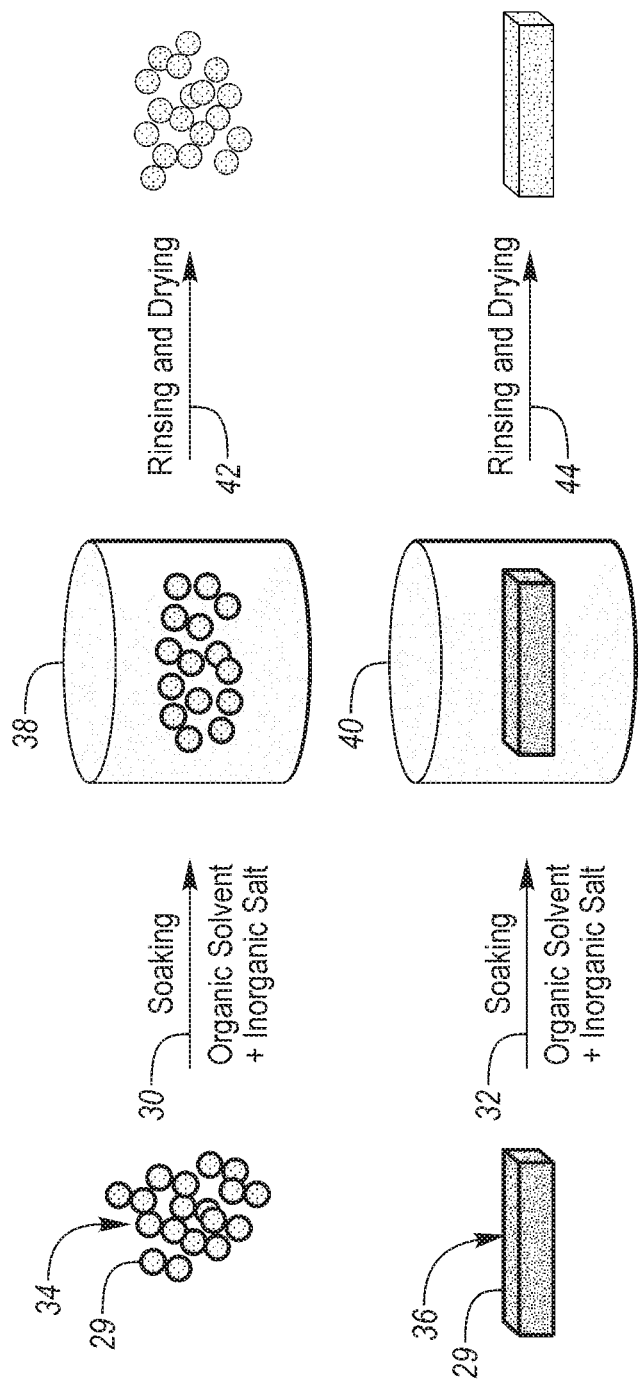
FIG. 2 is a schematic diagram of method steps for removing surface contamination from a $Li^+$ conducting ceramic oxide according to one embodiment.
Figure 3A:
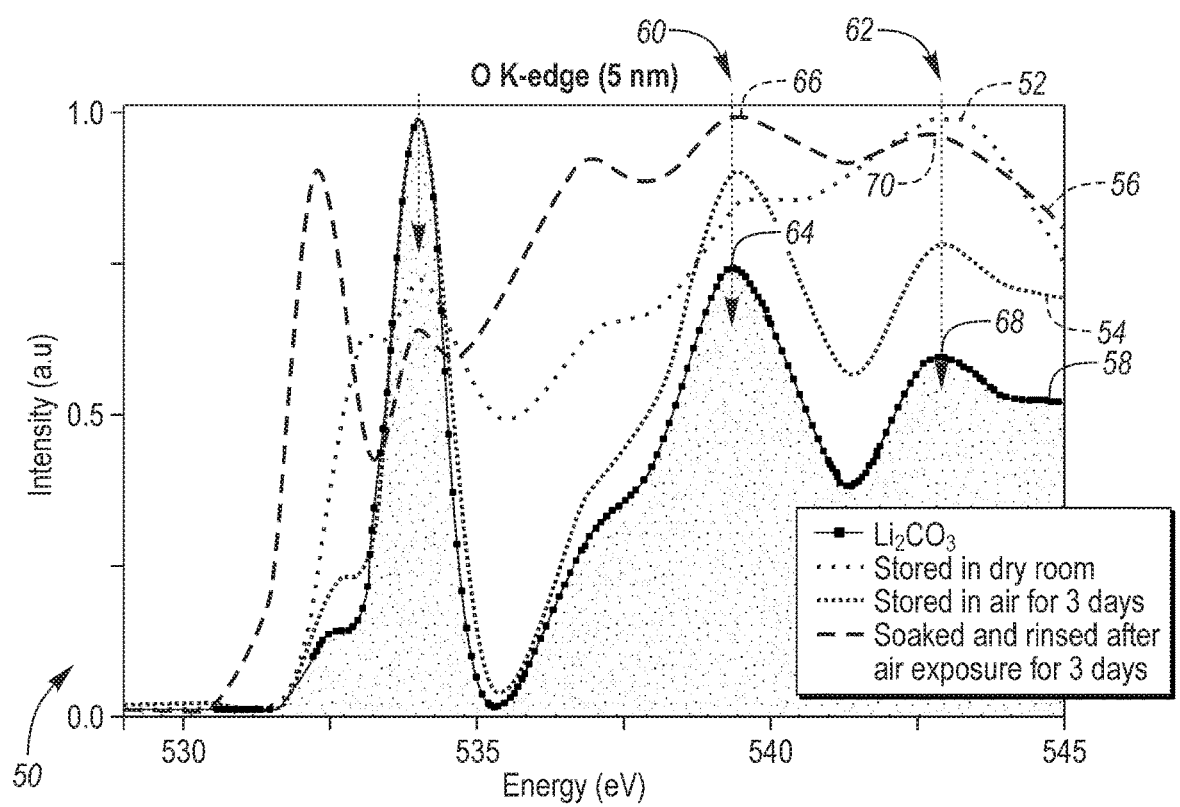
FIGS. 3a, 3b, 3c and 3d show graphs of soft x-ray absorption spectroscopy (XAS) spectrums of LLZO powder under different conditions.
Figure 3B:
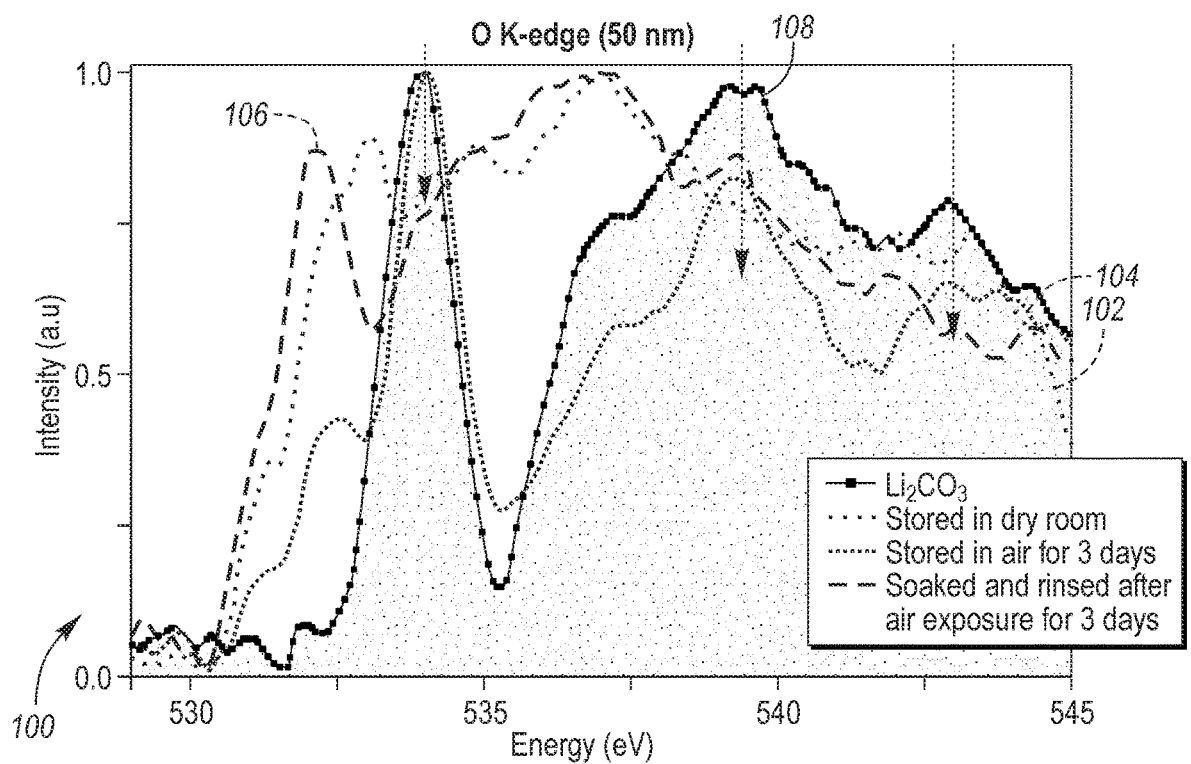
Figure 3C:
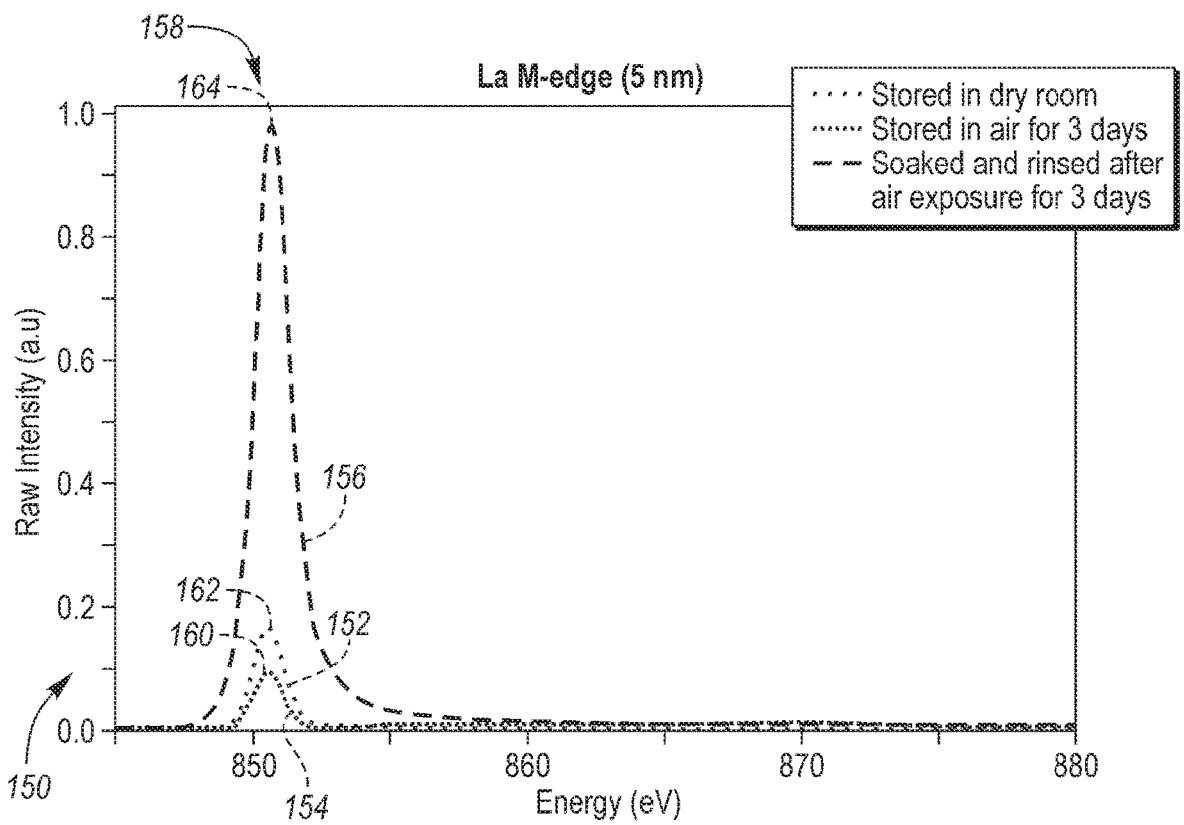
Figure 3D:
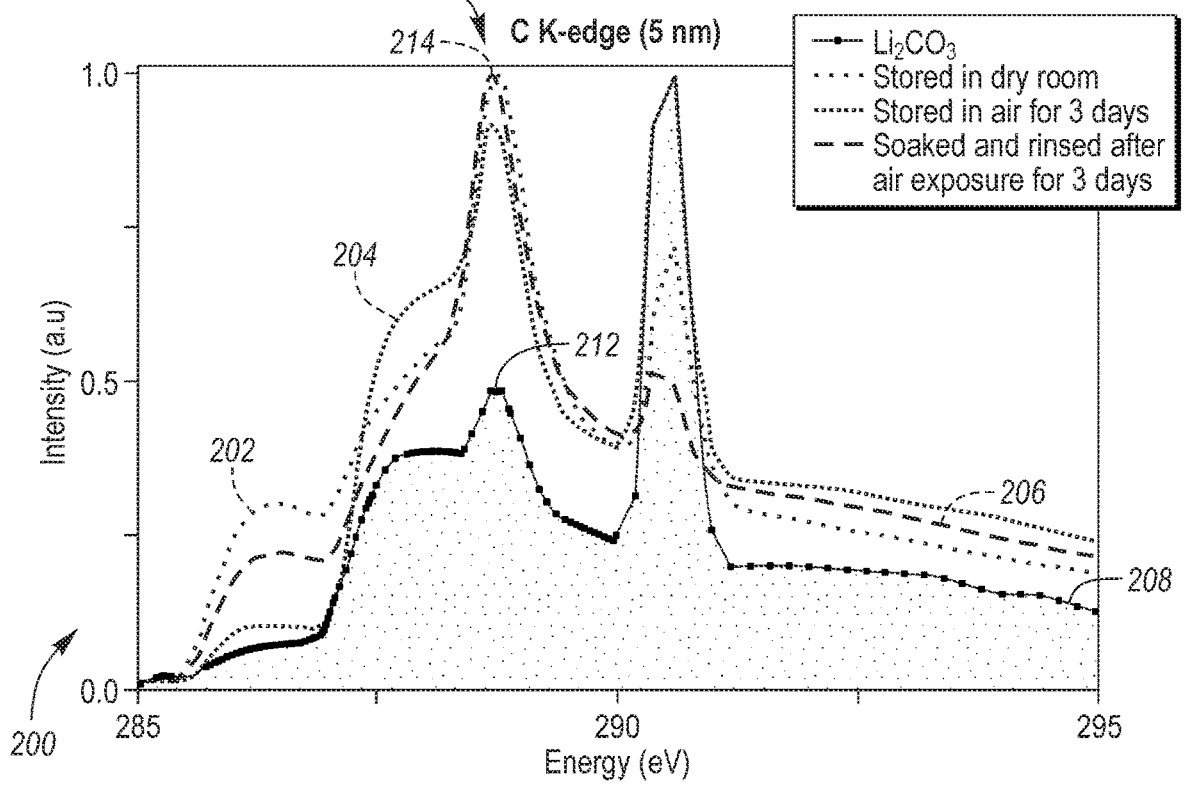

In one or more embodiments, a method for removing surface contamination from a Li$^+$ conducting ceramic oxide such as LLZO used as an SSE in an SSB is disclosed. FIG. 2 is a schematic diagram of method steps for removing surface contamination 29 from Li$^+$ conducting ceramic oxide powder material 34 and thin film material 36 according to one embodiment. The Li$^+$ conducting ceramic oxide powder material 34 may be spherical particles having a diameter one of the following values or within a range of any two of the following values: 400, 450, 500, 550 and 600 nm.

The thickness of surface contamination materials on the Li$^+$ conducting ceramic oxide powder material 34 before the soaking step 30 may be one of the following values or within a range of any two of the following values: 50, 55, 60, 65 and 70 nm in a surface region of the Li$^+$ conducting ceramic oxide powder material 34. The thickness of surface contamination materials on the Li$^+$ conducting ceramic oxide thin film material 36 before the soaking step 32 may be one of the following values or within a range of any two of the following values: 50 nm, 55 nm, 60 nm, 65 nm, 70 nm, 200 nm and 2 μm nm in a surface region of thin film material 36. In one embodiment, a planar 40 μm LLZO film would have the following amounts by weight of $Li_2CO_3$ surface contamination based on the thickness of $Li_2CO_3$ surface contamination: 0.2 wt % (200 nm) and 2 wt % (2 μm).

In one embodiment, the method includes a first step of soaking the Li$^+$ conducting ceramic oxide material in an organic solvent with a salt for a pre-determined amount of time at a pre-determined temperature, as shown by arrow 30 and 32 on FIG. 2. The Li$^+$ conducting ceramic oxide material may be soaked in different forms, including, but not limited to, powder form 34 or thin film form 36, where the thin film is shaped as used in an SSB. The thickness of the thin film may be any one of the following values or within a range of any two of the following values: 20, 30, 40, 50 and 60 μm. Non-limiting examples of organic solvents that can be used in one or more embodiments include tetrahydrofuran (THF) or 1,3-dioxolane (DOL), dimethoxy ethane (DME), tetra(ethylene glycol)dimethyl ether (TEGDME), Ethylene carbonate (EC), Propylene carbonate (PC), Dimethyl carbonate (DMC), Ethyl methyl carbonate (EMC), ethyl propyl ether (EPE), Diethyl carbonate (DEC), fluorinated cyclic carbonate (F-AEC), fluorinated linear carbonate (F-EMC), fluorinated ether (F-EPE), THF, glymes and mixtures thereof. Non-limiting examples of salts that can be used in one or more embodiments include $LiBF_4$, $LiPF_6$, $LiBC_4O_8$ (LiBOB), $LiPF_3(CF_2CF_3)_3$ (LiFAP), LiBr, LiCl, LiI, $LiClO_4$, LiFSI, $LiNO_3$, $LiPO_2F_2$, $Li(CF_3SO_2)_2N$ (LiTFSI), $LiCF_3SO_3$, $LiC(CF_3SO_2)_3$, $LiAsF_6$, $LiN(SO_2CF_2CF_3)_2$ (LiBETI) and mixtures thereof. The concentration of salt in the organic solvent may be any one of the following values or within a range of any two of the following values: 0.1, 0.2, 0.3, 0.4, 0.5, 0.6, 0.7, 0.8, 0.9, 1.0, 1.1 and 1.2 M. The pre-determined amount of time may be any one of the following values or within a range of any two of the following values: 1, 2, 3, 4, 5, 6, 7, 8, 9, 10, 11, 12, 13, 14 and 15 hours. The pre-determined temperature may be any one of the following values or within a range of any two of the following values: 20, 30, 40, 50 and 60° C.

In one embodiment, the method includes a second step of rinsing the Li$^+$ conducting ceramic oxide material in the same organic solvent as the first step or a different organic solvent for a pre-determined amount of time. Non-limiting examples of organic solvents that can be used in one or more embodiments include tetrahydrofuran (THF), 1,3-dioxolane (DOL), dimethoxy ethane (DME), tetra(ethylene glycol) dimethyl ether (TEGDME), Ethylene carbonate (EC), Propylene carbonate (PC), Dimethyl carbonate (DMC), Ethyl methyl carbonate (EMC), ethyl propyl ether (EPE), Diethyl carbonate (DEC), fluorinated cyclic carbonate (F-AEC), fluorinated linear carbonate (F-EMC), fluorinated ether (F-EPE), THF, glymes and a mixture thereof. The pre-determined amount of time may be any one of the following values or within a range of any two of the following values: 5, 10, 15, 20, 25 and 30 minutes. Li$^+$ conducting ceramic oxide powder material 34 and thin film material 36 may be placed in compartment 38 and 40, respectively, for the rinsing step.

In one embodiment, the method includes a third step of drying the Li$^+$ conducting ceramic oxide material after the soaking and rinsing steps. For example, the Li$^+$ conducting ceramic oxide material may be dried in vacuum conditions for a pre-determined amount of time. The pre-determined amount of time may be any one of the following values or within a range of any two of the following values: 60, 70, 80, 90, 100, 110 and 120 minutes. Li$^+$ conducting ceramic oxide powder material 34 and thin film material 36 may be placed in compartment 38 or 40, respectively, for the drying step. Compartments 38 and 40 may be held under vacuum conditions.

After the rinsing and drying steps 42 and 44 for Li$^+$ conducting ceramic oxide powder material 34 and thin film material 36, respectively, these materials are decontaminated from surface contamination. The thickness of surface contamination materials on the Li+ conducting ceramic oxide powder material 34 after drying step 42 may be one of the following values or within a range of any two of the following values: 1.0, 1.2, 1.4, 1.6, 1.8, 2.0, 3.0, 4.0, 5.0 and 20.0 nm in a surface region of the Li+ conducting ceramic oxide powder material 34. The thickness of surface contamination materials on the Li+ conducting ceramic oxide thin film material 36 after drying step 42 may be one of the following values or within a range of any two of the following values: 1.0, 1.2, 1.4, 1.6, 1.8, 2.0, 3.0, 4.0, 5.0 and 20.0 nm in a surface region of thin film material 36 after drying step 42. In one embodiment, a planar 40 μm LLZO film would have the following amount by weight of $Li_2CO_3$ surface contamination based on the thickness of $Li_2CO_3$ surface contamination: $2.1 \times 10^{-3}$ wt % (2 nm) and 0.02 wt % (20 nm). In one embodiment, a spherical 500 nm diameter LLZO particle would have the following amount by weight of $Li_2CO_3$ surface contamination based on the thickness of $Li_2CO_3$ surface contamination: 0.47 wt % (2 nm) and 5.16 wt % (20 nm).

FIGS. 3a, 3b, 3c and 3d show graphs 50, 100, 150 and 200 of soft x-ray absorption spectroscopy (XAS) spectrums of LLZO powder under different conditions. As described below, these soft XAS spectral graphs demonstrate that LLZO powder treated with process disclosed in one or more embodiments significantly reduces the presence of surface contaminants (e.g., $Li_2CO_3$).

Graph 50 depicts O K-edge (5 nm) spectra by plotting intensity (a.u) as a function of energy (eV) for LLZO powder under different conditions. Plot 52 depicts intensity (a.u) as a function of energy (eV) for LLZO powder stored in a dry room for six (6) months. Plot 54 depicts intensity (a.u) as a function of energy (eV) for LLZO powder stored in ambient air for three (3) days. Plot 56 depicts intensity (a.u) as a function of energy (eV) for LLZO powder that was treated using a treatment process of one embodiment in which the LLZO powder is soaked in a solution of ethylene carbonate and dimethyl carbonate with a $LiBF_4$ salt for 16 hours after air exposure for three (3) days. Plot 58 depicts intensity (a.u) as a function of energy (eV) for pure $Li_2CO_3$ for comparison to plots 52, 54 and 56. A decrease in intensity (a.u) as a function of energy (eV) is a result of carbonate removal from the LLZO powder. In region 60 of graph 50 at about 539 eV, the pure $Li_2CO_3$ plot 58 has the highest intensity peak 64, which is similar to the peak of the LLZO stored in air for three days, plot 54. The treated LLZO powder plot 56 has the lowest intensity peak 66 (in terms of the height of the peak compared to a baseline). In region 62 of graph 50 at about 543 eV, the pure $Li_2CO_3$ plot 58 has the highest intensity peak 68 while the treated LLZO powder plot 56 has a relatively lower intensity peak. These decreases in relative intensity support that carbonate contamination on the treated LLZO powder is significantly reduced by the treatment method, as opposed to the carbonate layer formed on the surface of the LLZO powder according to plots 52 and 54.

Graph 100 depicts O K-edge (50 nm) spectra by plotting intensity (a.u) as a function of energy (eV) for LLZO powder under different conditions. Plot 102 depicts intensity (a.u) as a function of energy (eV) for LLZO powder stored in a dry room for six (6) months. Plot 104 depicts intensity (a.u) as a function of energy (eV) for LLZO powder stored in ambient air for three (3) days. Plot 106 depicts intensity (a.u) as a function of energy (eV) for LLZO powder that was treated using the treatment process identified in connection with the example shown in FIG. 3a after air exposure for three (3) days. Plot 108 depicts intensity (a.u) as a function of energy (eV) for pure $Li_2CO_3$ for comparison to plots 102, 104 and 106. The peaks marked with arrows pointing downward decrease when the sample is treated according to one or more embodiments. These peaks are associated with $Li_2CO_3$, as shown by the reference measurement with $Li_2CO_3$ only. Accordingly, the treatment according to one or more embodiments removes $Li_2CO_3$.

Graph 150 depicts La M-edge (5 nm) spectra by plotting intensity (a.u) as a function of energy (eV) for LLZO powder under different conditions. Plot 152 depicts intensity (a.u) as a function of energy (eV) for LLZO powder stored in a dry room for six (6) months. Plot 154 depicts intensity (a.u) as a function of energy (eV) for LLZO powder stored in ambient air for three (3) days. Plot 156 depicts intensity (a.u) as a function of energy (eV) for LLZO powder that was treated using a treatment process identified in connection with the example shown in FIG. 3a after air exposure for three (3) days. In region 158 of graph 150 at about 851 eV, peak 160 of the LLZO powder stored in air for three (3) days plot 154 and peak 162 of the LLZO powder stored in a dry room plot 152 each have a different peak than peak 164 of the treated LLZO powder plot 156 by at least 0.7 a.u. This change supports that carbonate formation on the treated LLZO powder is significantly decreased by the treatment method of one or more embodiments.

Graph 200 depicts C K-edge (5 nm) spectra by plotting intensity (a.u) as a function of energy (eV) for LLZO powder under different conditions. Plot 202 depicts intensity (a.u) as a function of energy (eV) for LLZO powder stored in a dry room for six (6) months. Plot 204 depicts intensity (a.u) as a function of energy (eV) for LLZO powder stored in ambient air for three (3) days. Plot 206 depicts intensity (a.u) as a function of energy (eV) for LLZO powder that was treated using a treatment process identified in connection with the example shown in FIG. 3a after air exposure for three (3) days. Plot 208 depicts intensity (a.u) as a function of energy (eV) for pure $Li_2CO_3$ for comparison to plots 202, 204 and 206. The peaks decrease when the sample is treated according to one or more embodiments. These peaks are associated with $Li_2CO_3$, as shown by the reference measurement with $Li_2CO_3$ only. Accordingly, the treatment according to one or more embodiments removes $Li_2CO_3$.

Figure 4:
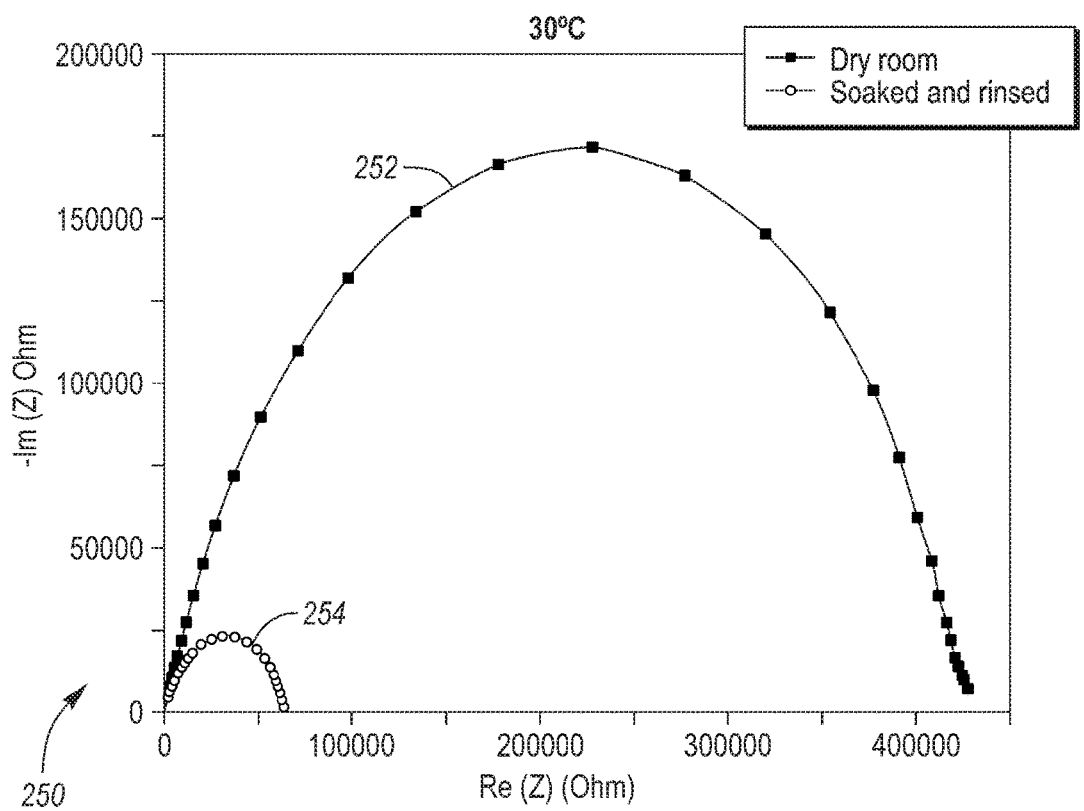
FIG. 4 depict representative Nyquist plots for Li/LLZO/Li cells at room temperature before and after a treatment according to an embodiment.

In further examples, the electrochemical cycling stability and interfacial resistance of an LLZO pellet with and without the treatment process of the examples in connection with FIGS. 3a to 3d was tested using a lithium plating and stripping process and electrochemical impedance spectroscopy (EIS). In one example, an LLZO pellet was a cylindrical pellet with a thickness of 0.2 cm with an electrode area of 11.3 cm². An EIS testing method was used to measure the contribution to impedance of a washed and unwashed pellet of LLZO at room temperature. The results of this test are shown in FIG. 4. FIG. 4 depict representative Nyquist plots for Li/LLZO/Li cells at room temperature before and after treatment. Graph 250 of FIG. 4 plots -Im (Z) Ohm as a function of Re (Z) (Ohm) for a dry room plot 252 and a treated plot 254. As shown in FIG. 4, treated pellets showed 6.5 times lower impedance in interfacial and bulk regions as compared to the untreated samples. The reduction of impendence may be one of the following values or within a range of any two of the following values: 6, 8, 10, 12, 14, 16, 18, 20 and 22 times. The reduction in total impedance is at least partially attributed to the removal of surface contaminants (e.g., $Li_2CO_3$) during the treatment.

Figure 5:
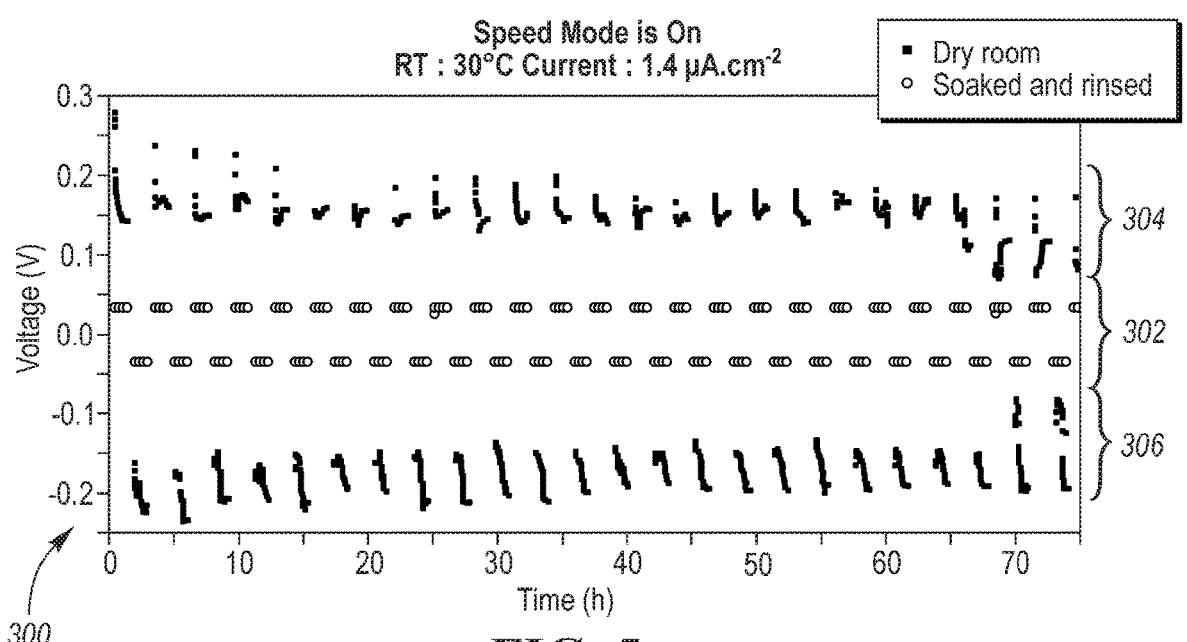
FIG. 5 depicts a graph of galvanostic cycling of Li/LLZO/Li cells at room temperature with a current density of 1.4 $\mu Acm^{-2}$ before and after a treatment according to an embodiment.

As a benefit of the treatment process of one or more embodiments, the conformal contact of Li metal on the LLZO surface increases, thereby increasing the effective ionic transfer area and transport of ions between LLZO and Li. Direct current lithium plating and stripping experiments were carried out to assess the impendence and Li ion transport capability across the LLZO and Li metal interface. FIG. 5 depicts a graph of galvanostic cycling of Li/LLZO/Li cells at room temperature with a current density of 1.4 $\mu Acm^{-2}$ before and after treatment. At a current density of 1.4 $\mu Acm^{-2}$ for 75 hours, the treated pellets stabilized at about 0.03 volts as shown in region 302, whereas the untreated samples exhibited a noisy potential response with large voltage polarization as shown in regions 304 and 306, which demonstrates uneven ion transport through the interface. The treatment process of one or more embodiments drastically reduces contamination to minimize or eliminate large interfacial impedance between LLZO (and other lithium conducting ceramic oxides) and Li in SSBs.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method of decontaminating a lithium conducting ceramic oxide material, the method comprises:
   soaking the lithium conducting ceramic oxide material having a first thickness of surface contaminants in a first organic solvent containing an inorganic salt at an inorganic salt concentration to obtain a soaked lithium conducting ceramic oxide material; and
   rinsing the soaked lithium conducting ceramic oxide material in a second organic solvent to obtain a decontaminated lithium conducting ceramic oxide material having a second thickness of surface contaminants less than the first thickness of surface contaminants.

2. The method of claim 1, wherein the second thickness is less than the first thickness by at least 90%.

3. The method of claim 1, wherein the surface contaminants include one or more carbonate compounds.

4. The method of claim 3, wherein the one or more carbonate compounds include $Li_2CO_3$.

5. The method of claim 1, wherein the inorganic salt concentration is 0.1 to 1.2 M.

6. The method of claim 1, wherein the lithium conducting ceramic oxide material $Li_7La_3Zr_2O_{12}$ (LLZO).

7. The method of claim 1, further comprising drying the decontaminated lithium conducting ceramic oxide material.

8. The method of claim 7, wherein the drying step includes vacuum drying the decontaminated lithium conducting ceramic oxide material.

9. The method of claim 1, wherein the lithium conducting ceramic oxide material is $Li_7La_3Zr_2O_{12}$ (LLZO), $Li_5La_3Ta_2O_{12}$ (LLTO) or $Li_6La_2CaTa_2O_{12}$ (LLCTO) or $Li_6La_2ANb_2O_{12}$ (A=Ca, Sr) or $Li_{1+x}Al_xGe_{2-x}(PO_4)_3$ (LAGP) or $Li_{14}Al_{0.4}(Ge_{2-x}Ti_x)_{1.6}(PO_4)_3$ (LAGTP) or perovskite $Li_{3x}La_{2/3-x}TiO_3$ (LLTO) or $Li_{0.8}La_{0.6}Zr_2(PO_4)_3$ (LLZP) or $Li_{1+x}Ti_{2-x}Al_x(PO_4)_3$ (LTAP) or $Li_{1+x+y}Ti_{2-x}Al_xSi_y(PO_4)_{3-y}$ (LTASP) or $LiTi_xZr_{2-x}(PO_4)_3$ (LTZP), $Li_2Nd_3TeSbO_{12}$ or is a mixture thereof.

10. The method of claim 1, wherein the first organic solvent is tetrahydrofuran (THF), 1,3-dioxolane (DOL), dimethoxy ethane (DME), tetra(ethylene glycol)dimethyl ether (TEGDME), Ethylene carbonate (EC), Propylene carbonate (PC), Dimethyl carbonate (DMC), Ethyl methyl carbonate (EMC), ethyl propyl ether (EPE), Diethyl carbonate (DEC), fluorinated cyclic carbonate (F-AEC), fluorinated linear carbonate (F-EMC), fluorinated ether (F-EPE), THF, glymes or a mixture thereof.

11. The method of claim 1, wherein the salt is $LiBF_4$, $LiPF_6$, $LiBC_4O_8$ (LiBOB), $LiPF_3(CF_2CF_3)_3$ (LiFAP), LiBr, LiCl, LiI, $LiClO_4$, LiFSI, $LiNO_3$, $LiPO_2F_2$, $Li(CF_3SO_2)_2N$ (LiTFSI), $LiCF_3SO_3$, $LiC(CF_3SO_2)_3$, $LiAsF_6$, $LiN(SO_2CF_2CF_3)_2$ (LiBETI) or a mixture thereof.

12. A method of forming a solid state electrolyte material, the method comprises:
   soaking a lithium conducting ceramic oxide material having a first thickness of surface contaminants in a first organic solvent containing an inorganic salt at an inorganic salt concentration to obtain a soaked lithium conducting ceramic oxide material;
   rinsing the soaked lithium conducting ceramic oxide material in a second organic solvent to obtain a decontaminated lithium conducting ceramic oxide material having a second thickness of surface contaminants less than the first thickness of surface contaminants;
   drying the decontaminated lithium conducting ceramic oxide material to obtain a dried, decontaminated lithium conducting ceramic oxide material; and
   mixing the dried, decontaminated lithium conducting ceramic oxide material with a polymer material to form a solid state electrolyte material.

13. The method of claim 12, wherein the polymer material is a ceramic polymer electrolyte material.

14. The method of claim 13, wherein the ceramic polymer electrolyte material is LLZO/polyethylene oxide (PEO).

15. The method of claim 12, wherein the first and second organic solvents are the same organic solvent.

16. The method of claim 12, wherein the first and second organic solvents are different organic solvents.

* * * * *